Jan. 2, 1923.

V. L. EMERSON.
STERILIZING APPARATUS.
FILED JULY 21, 1919.

1,440,868

Inventor
Victor Lee Emerson.

By [signature]

Attorney

Patented Jan. 2, 1923.

1,440,868

UNITED STATES PATENT OFFICE.

VICTOR LEE EMERSON, OF PHILADELPHIA, PENNSYLVANIA.

STERILIZING APPARATUS.

Application filed July 21, 1919. Serial No. 312,215.

*To all whom it may concern:*

Be it known that I, VICTOR LEE EMERSON, a citizen of the United States, residing at Philadelphia, in the county of Philadelphia and State of Pennsylvania, have invented certain new and useful Improvements in Sterilizing Apparatus, of which the following is a full and complete specification, reference being had therein to the accompanying drawings.

This invention relates to mechanism and processes to provide sterilization of substances, for example, food stuffs, liquids, serums, fluid extracts, and the like.

The sterilization of food stuffs and fluid extracts of all sorts is customarily accomplished by the application of heat for a continued period, or, at some instances, by the application of radiant energy. In some instances use has been made of high pressures, which, imposed upon the material, will be effective to kill the living organisms.

In the use of the latter process, namely, the application of pressure, it has been suggested to develop and apply a gradual increase in fluid pressure. This necessitates considerable lapse of time and complicated mechanisms.

It is an object of this invention to accomplish the above results in a minimum space of time and with improved results over the mechanism so far utilized. Use is made of the principle that living organisms are incapable of withstanding the shock of a sudden blow. When such variations of fluid pressure are applied gradually, the organisms can, to a certain extent, accommodate themselves to such variation without appreciable injury, whereas if they are subjected to a sudden shock, the organisms are killed. It has been found by experimentation that the sterilization of such fluids as water can be carried out effectively by this process and means, regardless of the fact that they have previously been under maintained high pressures without a diminution in the bacterial content.

Another object of this invention is to make available means for treating successive portions of the material rapidly, uniformly and effectively.

The means provided to accomplish the above and other obvious results may permit the treatment of material either when delivered to the treating device as a fluid or when admitted to that device in containers.

A further object of the invention is to produce a pressure developing means of simple and rugged construction capable of rapid use with little depreciation.

Other advantages resulting from this process and mechanism will be evident to those skilled in the art on a consideration of the following specification and by reference to the accompanying drawings.

Figure 1:
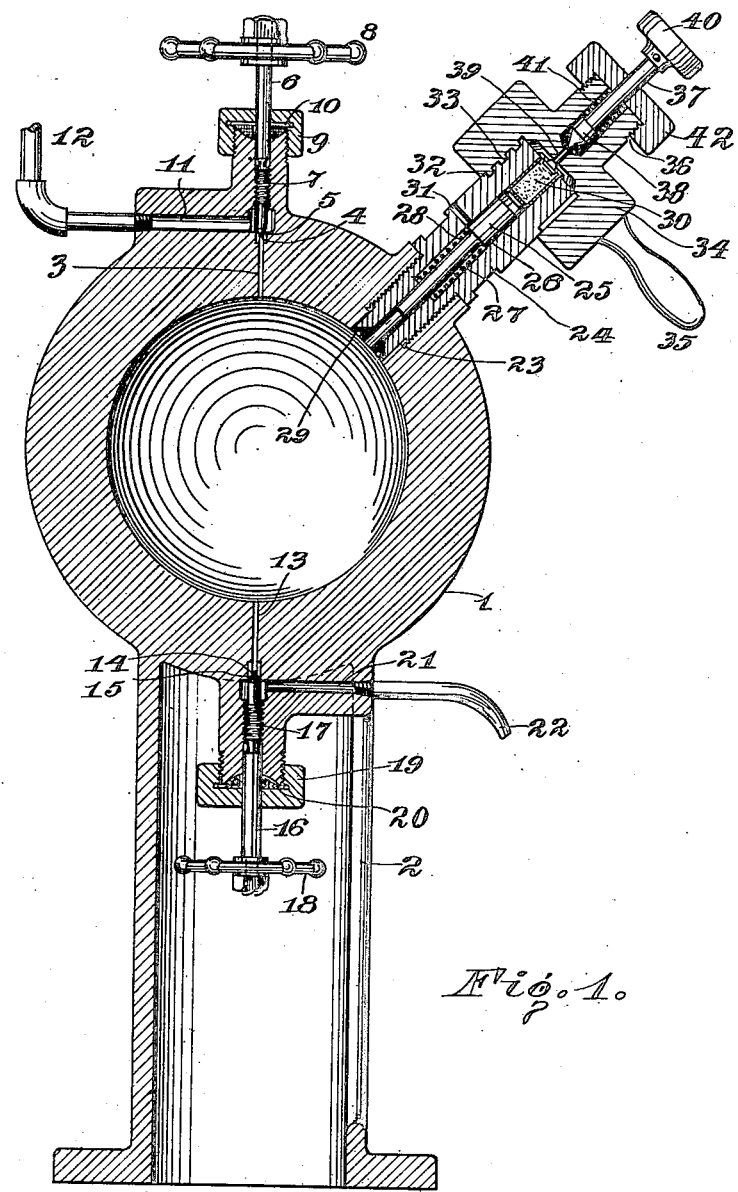
Figure 1 is a vertical cross section of the device adapted for the treatment of material in fluid form.

In the mechanism illustrating one form of my apparatus, the thick walled receptacle 1 is built to withstand high internal pressure. The receptacle has a depending support 2 adapted to secure the device upon any convenient support. The support 2 is apertured on one side for a purpose to be hereinafter described. The upper portion of the receptacle 1 is drilled axially to provide an inlet passage 3. The upper portion of the inlet passage has bearing 4 against which the needle valve 5 mounted on shaft 6 may be brought when the shaft is rotated over the screw threads 7 by means of the hand wheel 8. This shaft 6 passes through a boss fitted at its upper end with a screw threaded cap 9 enclosing a packing 10 around the shaft 6. The wall of the receptacle 1 is drilled horizontally to provide a passage 11 communicating through valve 5 with the passage 3. An inlet pipe 12 serves to admit the material to the passage 11.

The bottom of the receptacle 1 is drilled to provide an outlet passage 13. A corresponding valve seat 14 and valve stem 15 close the exit passage 13. The valve stem 15 forms part of the shaft 16, screw threaded as at 17 in a boss depending from the receptacle. The shaft 16 is operated by means of the hand 18. This hand wheel may be manipulated through the aperture in the support 2.

Communicating with the valve seat is the exit passage 21 and pipe 22 serving to drain the receptacle of the material after it has been treated.

Suitably screw threaded, as at 23 in the wall of the receptacle, is the plug 24. This plug is recessed along its longitudinal axis and carries slidably mounted therein a plunger 25 with an enlarged head 26. The recess of the plug is enlarged as at 27 to accommodate the head of the plunger. Extending between the enlarged head 26 and the forward wall of the larger portion of the recess is placed an expansion spring 28 serving to hold the plunger normally retracted with its forward end withdrawn from the chamber of the receptacle. Between the front face of the plug and the forward end of the plunger is located a fluid proof packing 29. This packing obturates under the pressure delivered in the chamber and consequently prevents leakage of the fluid past the plunger.

The rear end of the recess in the plug is adapted to receive an explosive cap or cartridge 30 of ordinary construction. The expansive force created by explosion of the cartridge will act to advance the plunger until the enlarged end of the latter clears the exhaust port 31.

The rear end of the plug has a mutilated screw thread 32 coacting with a corresponding mutilated screw thread 33 forming part of a cap 34. The cap 34 is provided with a handle 35 and a rearwardly extending reduced portion 36. The cap and its reduced portion are drilled centrally to receive a firing pin 37. The firing pin 37 comprises a plunger of normal diameter and enlarged ring 38, a striking point 39 and a button 40. The enlarged ring 38 serves as an abutment for the expansion spring 41 which surrounds the normal diameter of the shaft 37 and abuts against a screw threaded cap 42 mounted on the reduced portion 36.

Figure 2:
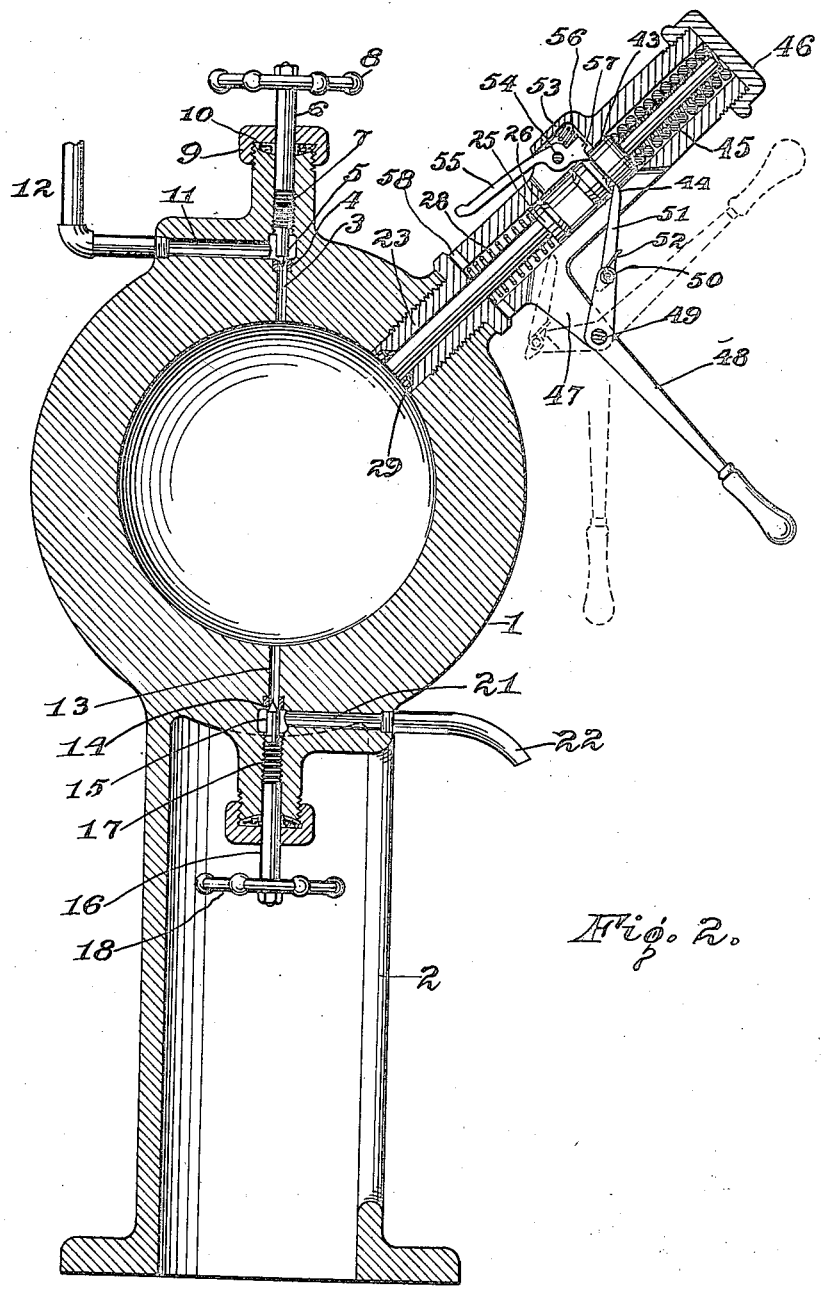
Figure 2 shows a modification in the means for producing the pressure for sterilization.

It is sometimes advantageous to use mechanical means for impelling the plunger instead of explosive means. An example of means attaining this end is indicated in Figure 2. The plug 23 is axially recessed, as has been described, and carries the plunger 25 in the same manner as above described. In the recess of the plug in the rear of the plunger 25 I place a striker 43. This striker has an enlarged head with a circumferential groove 44. The reduced portion of the striker abuts against a spring 45 which, in turn, rests upon the cap 46. The cap is screw threaded on the rear of the plug. A longitudinal slot is constructed in the side wall of the plug and at its lower end, bracket 47 supports a bell crank lever 48 on pivot 49. The inner extremity of the bell crank lever is supplied with pivot 50. A pawl 51 is held on pivot 50 in a forward position by means of spring 52. The end of the pawl 51 is adapted for engagement in the groove 44 of the striker 43. On the opposite side of the plug will be found a slot having an over-hanging wall 53. Transverse of this slot and beneath the over-hanging part 53 is inserted a pivot pin 54 which carries a trigger 55. The upper portion of the trigger 55 is held in advanced position by the expansive spring 56. On the forward part of the trigger, and opposite the spring, is the sear 57. This sear is adapted for engagement with the groove 44.

The movement of the bell crank lever 48 carries the pawl 51 forward and backward in the slot of the plug in such fashion that the point of the pawl is removed from the axial recess of the plug at each end of its movement, but during its passage from one end to the other, the point penetrates the recess of the plug, engages in the groove 44 and retracts the striker 43 until the sear 57 engages the same. The pawl is then withdrawn from the recess by a reverse movement of the bell crank lever.

Material is admitted into the receptacle by opening the valves. The valves are then closed confining the fluid to the receptacle. The cap 34 is removed and the cartridge 30 set in the rear of the recess in the plug. The cap 34 being replaced and locked in position, firing is accomplished by drawing out the button 40 and letting the striker advance suddenly with the force of the spring 41. The striker ignites the charge in the cartridge delivering the full force of the explosion against the enlarged head of the plunger. The plunger then travels instantaneously forward compressing the spring 27.

The forward travel of the plunger 25 carries the enlarged head beyond the exhaust port 31 releasing the burned out gases of the cartridge and reducing the pressure on the plunger to normal. The spring 27 now serves to return the plunger to its retracted position, resting on the forward edge of the empty shell of the cartridge. As soon as the cap 34 is removed, the plunger moves back a small distance, serving to eject the empty shell.

The device is now ready for the removal of the treated material by draining it through the pipe 22. The receptacle is then refilled and the operation repeated.

This action serves to drive the forward end of the plunger against the body of the material contained in the receptacle and to deliver to such material in all directions the full explosive force of the cartridge. There results an instantaneous shock which is transmitted through the liquid in the receptacle to the living organisms therein and may amount to approximately one hundred thousand foot pounds. This effectively serves to rupture the cell bodies contained in the fluid or other material in the receptacle and to kill the living organisms.

As stated above, the instantaneous shock serves to accomplish the breaking down of the walls of such cell bodies as may be contained therein and to render sterile the contents of the material.

In the operation of the device shown in Figure 2 the receptacle is filled, as above described, and the striker 43 retracted and cocked by a downward movement of the handle end of the lever 48. The upward movement of the handle releases the pawl from engagement with the striker 43, and leaves the latter resting against the sear 57. The trigger 55 is pulled down, releasing the striker 43 which advances and strikes a heavy blow against the liquid in the receptacle. After the initial impulse of the striker against the plunger, the latter returns a short distance under the influence of spring 28. The velocity imparted to the plunger is checked by the contact of the plunger with the non-compressible fluid in the receptacle and the kinetic energy possessed by the moving plunger delivers a severe blow against the fluid which blow is transmitted through the fluid to the living organisms therein resulting in their destruction. Ports 58 are provided in the sides of the plug to permit the escape of air from in front of the enlarged head of the piston 25.

The device, on being emptied and refilled, can be reset and a second time released.

It is sometimes advantageous to repeat the treatment of a single charge of material by several movements of the plunger 25.

From the above description it will be evident that by the means described, material may be treated either in bulk, as a fluid, or by the insertion of containers of material through a fluid tight door in the side of the receptacle. The material, as charged in the receptacle, will be subject to the action described resulting in its purification.

The treatment accorded successive charges of material is absolutely uniform.

It is to be understood that the present invention is susceptible of variation from the specific embodiment thereof herein set forth and that the same may be modified within the scope of the appended claims.

What I claim as my invention is:—

1. A sterilizer comprising a fluid tight receptacle means for filling said receptacle with a fluid to be sterilized and means independent of said fluid adapted to impart a shock to said fluid in said receptacle by concussive impact therewith.

2. A sterilizer comprising a fluid tight receptacle, a valved entrance thereto, a valved exit therefrom and means independent of said fluid adapted to impart a shock to said fluid in said receptacle by concussive impact therewith.

3. A sterilizer comprising a fluid tight receptacle adapted to withstand high internal pressure, means for admitting the material to said receptacle, means for withdrawing material from said receptacle and means independent of the material in said receptacle adapted to impart a shock to said material in said receptacle by concussive impact therewith.

4. A sterilizer comprising a fluid tight receptacle, a plunger adapted to penetrate the wall of said receptacle and means to cause the plunger to impart a concussive blow to the fluid in said receptacle.

5. A sterilizer comprising a fluid tight receptacle, a plunger adapted to pass through the wall of said receptacle and means to cause the plunger to impart a concussive blow to the material in said receptacle.

6. A sterilizer comprising a fluid tight receptacle, a plunger adapted to pass through the wall of said receptacle, a spring for holding the plunger in retracted position, means to impel said plunger rapidly against said spring and fluid in said receptacle and releasing mechanism for said impelling means.

7. A sterilizer including a receptacle adapted to withstand high internal pressure, a recessed plug mounted in the wall of said receptacle, a plunger carried in said recess and adapted to pass through the wall of said receptacle, a spring for holding the plunger in retracted position, means to impel said plunger rapidly against said spring, said means including a striker carried in said recess, and a spring for advancing said striker, means to set said striker in retracted position, and means to releasably hold said striker retracted.

8. In a sterilizer, a receptacle, means to sterilize the contents of the receptacle, said means including a recessed plug in the wall of the receptacle, a plunger in said recess adapted to penetrate the receptacle, a striker for advancing said plunger, said striker having an enlarged head with a circumferential groove, means engaging in said groove to retract the striker and means engaging in said groove to releasably retain said striker in retracted position.

9. In a sterilizer, a receptacle, means to sterilize the contents of the receptacle, said means including a recessed plug, a plunger therein, a striker carried in said recess, a spring to impel the striker against the plunger, striker retracting means, and means to releasably retain the striker in retracted position.

10. In a sterilizer, a receptacle, means to sterilize the contents of the receptacle, said means including a recessed plug, a plunger carried therein, a striker having a grooved head carried in said recess, means to impel the striker against the plunger, a lever pivoted to the plug, and a spring-pressed pawl carried on the lever for engagement with the grooved head of the striker.

11. In a sterilizer, a receptacle, means to sterilize the contents of the receptacle, said means including a recessed plug, a plunger carried therein, a striker having a circumferentially grooved head carried in said recess, means to impel the striker against the plunger, a lever pivoted on the plug, a spring-pressed pawl carried on the lever and a releasable trigger carried on the plug, the pawl and trigger adapted to engage the groove in the striker.

12. In a sterilizer, a receptacle, means to sterilize the contents of the receptacle, said means including a recessed plug, a plunger carried therein, a striker, an advancing spring therefor, retracting means and a spring-held trigger holding the striker in retracted position.

In testimony whereof I have hereunto set my hand.

VICTOR LEE EMERSON.